Jan. 19, 1937.   E. H. MUELLER   2,067,976
MEANS FOR ATTACHING HANDLES TO STEMS
Filed July 3, 1935

INVENTOR.
Ervin H. Mueller,
BY
ATTORNEYS

Patented Jan. 19, 1937

2,067,976

UNITED STATES PATENT OFFICE 2,067,976

MEANS FOR ATTACHING HANDLES TO STEMS

Ervin H. Mueller, Grosse Pointe Park, Mich.

Application July 3, 1935, Serial No. 29,767

2 Claims. (Cl. 287—53)

This invention relates to means for detachably attaching to the end of a shaft or stem, a member having a socket or opening to receive said end, and more particularly to a construction especially adapted for so attaching a handle formed of fragile material, to the stem of a gas cock or the like.

An object of the present invention is to simplify and make more effective, handle attaching means, the same being secured through the construction of the stem alone which is such as to effect a heavy frictional contact between stem and walls of socket to provide a better hold and eliminate all play of the handle in use.

It is also an object to so construct the stem as to insure against breakage of the stem parts, and to so arrange these parts that one provides a rigid member and the other a yielding member fulcrumed adjacent its free end upon said rigid member to strengthen the yielding member and increase its resistance to yielding, the relative positions of said members being such as to further increase the frictional hold of the handle to the stem, by applying the yielding force of the yielding member in a direction to force a flat side wall of the handle socket, into direct contact with a flat side of the stem, the cross-sectional shape of socket and stem being of substantially D-form and so shaped that such forcing of said flats into contact, also causes a wedging action of stem within socket in a direction at right angles to the direction of application of force of the spring or yieldable member, whereby all play or looseness of the handle upon the stem in every direction, is eliminated.

Further objects and advantages of the present construction will more fully appear by reference to the following description and accompanying drawing in which Fig. 1 is a side elevation of a gas cock with a handle applied to the stem thereof and shown partly in section, the same being illustrative of an embodiment of the present invention;

Figure 1:
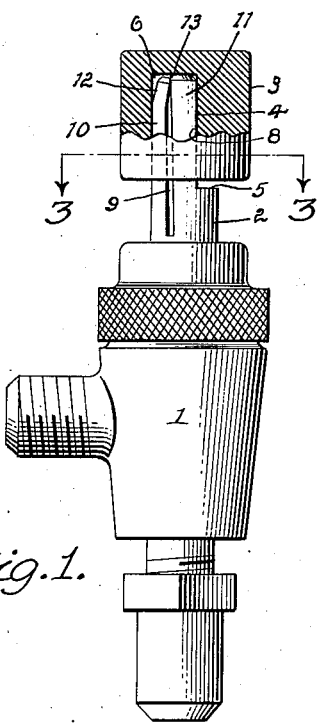
Figure 5:
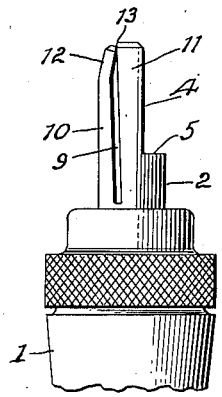
Figure 3:
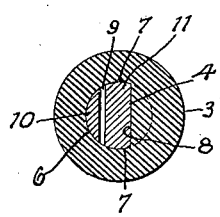
Fig. 3 is a transverse section upon the line 3—3 of Fig. 1.
Figure 2:
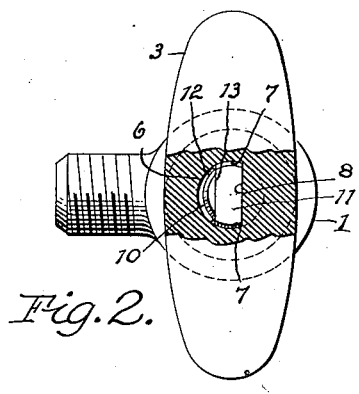
Fig. 2 is a plan view of Fig. 1, with the handle 45 partly in section.
Figure 4:
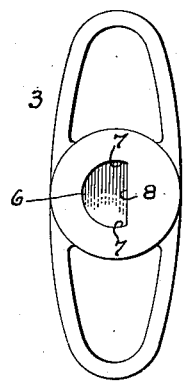
Fig. 4 is an inverted plan view of the handle detached.

Fig. 5 is a side elevation of the upper part of Fig. 1, with the handle removed.

For the purpose of illustrating an application of the invention in use, an ordinary gas stove valve is shown comprising the body 1, from which the stem 2 for operating the valve, projects and to which projecting end, a handle 3 of any suitable configuration is applied.

To rigidly and detachably attach said handle to said stem, said handle is formed with a socket to receive an end portion of said stem, said socket being of substantially D-form in cross-section, and said stem end portion having a similar cross-sectional shape to fit within said socket, said end portion of said stem being cut away or slabbed off at one side to form a flat side 4 and a shoulder 5 at the inner end of said surface 4. Before being so formed, this end portion of the stem was cylindrical, and to form the flat 4, the side of the cylinder is cut transversely along a plane cutting the cylinder laterally of its axis, that is, the part removed is less than a half-cylinder and, therefore, the remaining end portion has an outer circular surface extending beyond the longitudinal axial plane of the stem and meeting the side edges of the flat 4 with the width of this flat less than the diameter of such circle. This circular surface, in cross section, thus extends inwardly or converges toward the flat, and as the socket 6 in the handle has a like cross sectional shape, when the handle is applied to this stem end, and handle and stem are moved relatively by force applied in a direction to bring the flats of the socket and stem into firm contact, there is a wedging action of the stem in the socket due to such convergence of the portions 7 of the circular wall of the socket adjacent the meeting angles of said portions with the sides of the flat 8 of the socket wall. This wedging action eliminates all lost motion or play of the handle on the stem in the direction of the plane of the flats 4 and 8, and by bringing these flats into firm contact, all play is eliminated in a direction at right angles to said plane.

To provide for an expansive yielding action of said stem end within said handle socket, to exert a force tending to move said handle and stem relatively and force said flats 4 and 8 into very firm frictional contact and wedge said stem between the converging portions 7 of the wall of the socket, said stem is split longitudinally as at 9, inwardly from its free end to a point well inwardly of the plane of the shoulder 5, and this split or cut extends across the stem at the side thereof opposite the flat 4, thus forming a spring finger 10 at one side of said split and a rigid post 11 at the other side, the outer surface of said finger being semi-circular to engage the wall of the socket at the side thereof opposite the flat 8 and by its spring action, force said flats into firm frictional contact, such spring action of said finger being increased by bending the same intermediate the ends of the split, away from the post 11 a limited amount, and by bending the free end of said finger toward the post as at 12 with said end in engagement with the adjacent flat side of the post and at the end thereof, the free end of the finger being thus fulcrumed as at 13 or bears upon said post, giving support for said end of the finger to further resist flexure of said finger under pressure applied in forcing the stem into the handle socket, said bent end 13 of the finger moving longitudinally in frictional contact with the post under such compressive force against the finger, and giving support to said end to prevent the finger from being broken when heavy twisting or lateral strain is applied to the handle in use.

To further strengthen the finger against breakage under continued flexure, the slit 9 instead of extending longitudinally inward of the stem exactly parallel with the stem axis, extends at an inclination to such axes so that said finger is of increasing cross sectional area toward its inner end and outside the handle socket where ordinarily the greatest flexure would occur and where it is most liable to break off. The bent end portion 12 of said finger by its engagement with the post 11 at the extreme outer end thereof, provides a bevel at the end of the stem to assist its entry into the handle socket, and as this outer end of the finger engages the substantially rigid post at its free end, yielding only intermediate its ends, it is in effect, a solid stem having ample strength and rigidity to take the strain applied in operating the valve and in attaching or detaching the handle.

Obviously changes in construction may be made within the scope of the appended claims, and such changes are contemplated.

What I claim is:—

1. The combination with a stem of substantially D-form in cross section and split longitudinally inward from its free end and transversely in the direction of the width of the flat side thereof to form an integral spring finger having an arcuate outer side forming a continuation of the outline of the stem in cross section, said finger being bent outwardly intermediate its ends and inwardly at its free end to seat at the free end of the stem to reinforce spring action and to form a taper at the end of the stem, and a handle formed with a socket of substantially D-form in cross section to receive the end portion of said stem with the arcuate side of said spring finger engaging the similarly curved wall of the socket to increase frictional engagement of stem with socket.

2. The combination with a stem of substantially D-form in cross section and split longitudinally inward from its free end with said split extending longitudinally of said stem at an inclination to the axis of said stem, said split extending transversely of said stem substantially parallel with said flat side thereof to form a spring finger of increasing cross-sectional area towards its inner end at the curved side of said stem opposite said flat side, said finger bearing at its free end against said stem, and a handle formed with a socket of substantially D-form in cross section to receive the end portion of said stem and finger.

ERVIN H. MUELLER.